(12) United States Patent
Achterberg

(10) Patent No.: US 8,569,982 B2
(45) Date of Patent: Oct. 29, 2013

(54) METHOD OF DETERMINING THE POSITION OF THE DRIVE MECHANISM OF AN ELECTRIC MACHINE, SUCH AS A MOTOR, FROM THE CURRENT SUPPLIED, AND ARRANGEMENT FOR CARRYING OUT THE METHOD

(75) Inventor: Jan Achterberg, Duisburg (DE)

(73) Assignee: Kollmorgen Europe GmbH (DE)

( * ) Notice: Subject to any disclaimer, the term of this patent is extended or adjusted under 35 U.S.C. 154(b) by 345 days.

(21) Appl. No.: 13/002,460

(22) PCT Filed: Jul. 3, 2009

(86) PCT No.: PCT/EP2009/004845
§ 371 (c)(1),
(2), (4) Date: Apr. 11, 2011

(87) PCT Pub. No.: WO2010/000489
PCT Pub. Date: Jan. 7, 2010

(65) Prior Publication Data
US 2011/0181227 A1    Jul. 28, 2011

(30) Foreign Application Priority Data

Jul. 3, 2008   (DE) .......................... 10 2008 031 201

(51) Int. Cl.
*H02K 29/06*   (2006.01)

(52) U.S. Cl.
USPC ................. 318/400.32; 318/400.26; 318/650

(58) Field of Classification Search
USPC ................. 318/650, 400.32, 400.26, 400.02, 318/400.21, 400.34, 400.08
See application file for complete search history.

(56) References Cited

U.S. PATENT DOCUMENTS

| | | | |
|---|---|---|---|
| 2002/0043953 A1 | 4/2002 | Masaki et al. | |
| 2011/0057593 A1* | 3/2011 | Williams et al. | 318/400.26 |

FOREIGN PATENT DOCUMENTS

EP    DE10163010    11/2002

* cited by examiner

*Primary Examiner* — Karen Masih
(74) *Attorney, Agent, or Firm* — Becker & Stachniak, P.C.; Robert W. Becker

(57) ABSTRACT

A method and arrangement for determining the position of the drive mechanism of an electric machine from the current supplied thereto. Determination of the position is effected over two independent channels by measuring the three-phase current of the electric machine or motor, converting the measured values to the current space vector, calculating the angle of the current space vector within one electrical revolution, and determining the position of the motor. A current command, the field of which acts in the direction of the flux or field of the drive mechanism or rotor, is added within the motor stator.

14 Claims, 2 Drawing Sheets

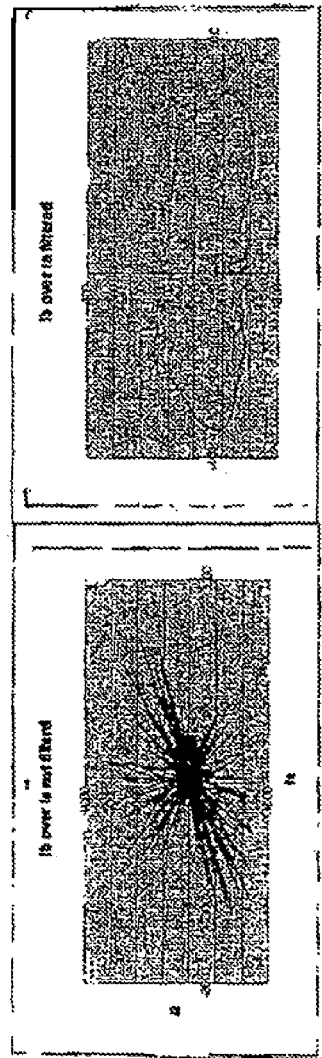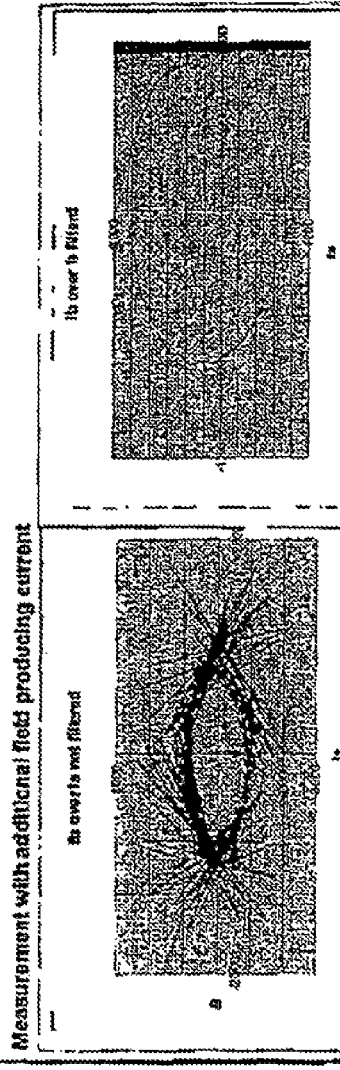

METHOD OF DETERMINING THE POSITION OF THE DRIVE MECHANISM OF AN ELECTRIC MACHINE, SUCH AS A MOTOR, FROM THE CURRENT SUPPLIED, AND ARRANGEMENT FOR CARRYING OUT THE METHOD

The instant application should be granted the priority dates of Jul. 3, 2008, the filing date of the corresponding German patent application 10 2008 031 201.0, as well as Jul. 3, 2009, the filing date of the International patent application PCT/EP2009/004845.

BACKGROUND OF THE INVENTION

The present invention relates to a method for determining the position of the drive mechanism of an electric machine, such as a motor, from the current that is supplied, whereby for the reliable operation, the determination of the position of the drive mechanism is effected over two paths or channels that are independent of one another, and thereafter the two position values are combined and are cross checked with respect to a safe manner of operation, such as maintenance of a safe speed or safe positioning of the drive mechanism, including the following method steps:
- determination of the position of the drive mechanism in one channel by measuring the three-phase current of the machine, subsequently
- converting the measured values of this three-phase current to a current space vector
- calculating the angle of the current space vector within one electrical revolution, and
- determining the position of the drive mechanism (rotor).

Such a method is already known from DE 101 63 010 B4.

The known method has the drawback that at low speeds and/or low loads, the amplitude or length of the current space vector is about 0, and due to the fluctuation of the measured values in all possible directions due to the super imposed speed and position regulation, which adversely affects the measurement of the position and later the calculation e.g. of the speed due to the position alteration, the measurements show large errors with regard to position and speed.

It is an object of the present invention to ensure that the direction of the current space vector can be determined precisely, even at low speeds and low loads.

SUMMARY OF THE INVENTION

This object is realized in that a current command, the field of which acts in the direction of the rotor flux or rotor field, is added within the stator.

The result of proceeding in this manner is that no fluctuation of the measured value occurs any longer about the 0 point, and a considerably greater precision of the measurement is achieved, since a sufficiently large current always flows.

Pursuant to a further embodiment of the method of the present invention, the electric machine is a servomotor having permanent magnetic generation of the magnetic field of the rotor, while the winding or coil through which the current flows is disposed in the stator.

Pursuant to yet another embodiment of the method, the angle of the current space vector serves for the determination of the position of the rotor of the servomotor.

Pursuant to yet another embodiment of the inventive method, the angle of the current space vector serves for the determination of the change in position over time and hence of the speed of the rotor of the servomotor or a reliable monitoring of a position.

A current command is then added in the direction of the flux/field within the rotor when the current that produces the torque is low in comparison to the rated current (can also be effected permanently).

Pursuant to a further development of the method of the invention, a current command is then added in the direction of the flux/field within the rotor if the velocity of the rotor (speed) is low in comparison to the rated speed.

On the other hand, a current command can be added in the direction of the flux/field within the rotor if the current space vector moves about the value zero (but can also be permanently added).

It is also possible to add a current command in the direction of the flux/field within the rotor only if due to the regulation of the servo loops, the current space vector jumps back and forth (can however be added permanently).

The present invention also relates to an apparatus or arrangement for the improved measurement of the position of the drive mechanism of an electric machine, such as a motor, from the current supplied, whereby for the reliable operation the measurement, e.g. of the position of a drive mechanism, is effected over two paths or channels that are independent of one another, and thereafter the two measured values are combined and are cross checked with respect to a reliable manner of operation, such as maintenance of a safe speed of the drive mechanism, including
- a processor for the determination of the position of the drive mechanism in one of the channels, with a sensor for the measurement of the three-phase current of the machine, and following the sensor
- a converter for the conversion of the measured values of this three-phase current to a current space vector, and following the converter
- a computer or calculating unit for the calculation of the angle of the current space vector within one electrical revolution, and
- for the determination of the position of the drive mechanism (rotor),
whereby inventively
- a current command, the field of which acts in the direction of the rotor flux or rotor field, is added within the stator (direction of weakening of the field), thereby increasing the precision of the measurement.

BRIEF DESCRIPTION OF THE DRAWINGS

The invention will be described in greater detail subsequently with the aid of specific embodiments.

Shown are:

FIG. 2 an oscillogram of the current of the line IA plotted against the current of the line IB without filtration, FIG. 2B the currents IA over IB with filtration, FIG. 3A an oscillogram of the current IB plotted against IA with current generating an additional field without filtration, and FIG. 3B the current IA plotted against IB after filtration.

DESCRIPTION OF PREFERRED EMBODIMENTS

Figure 1:
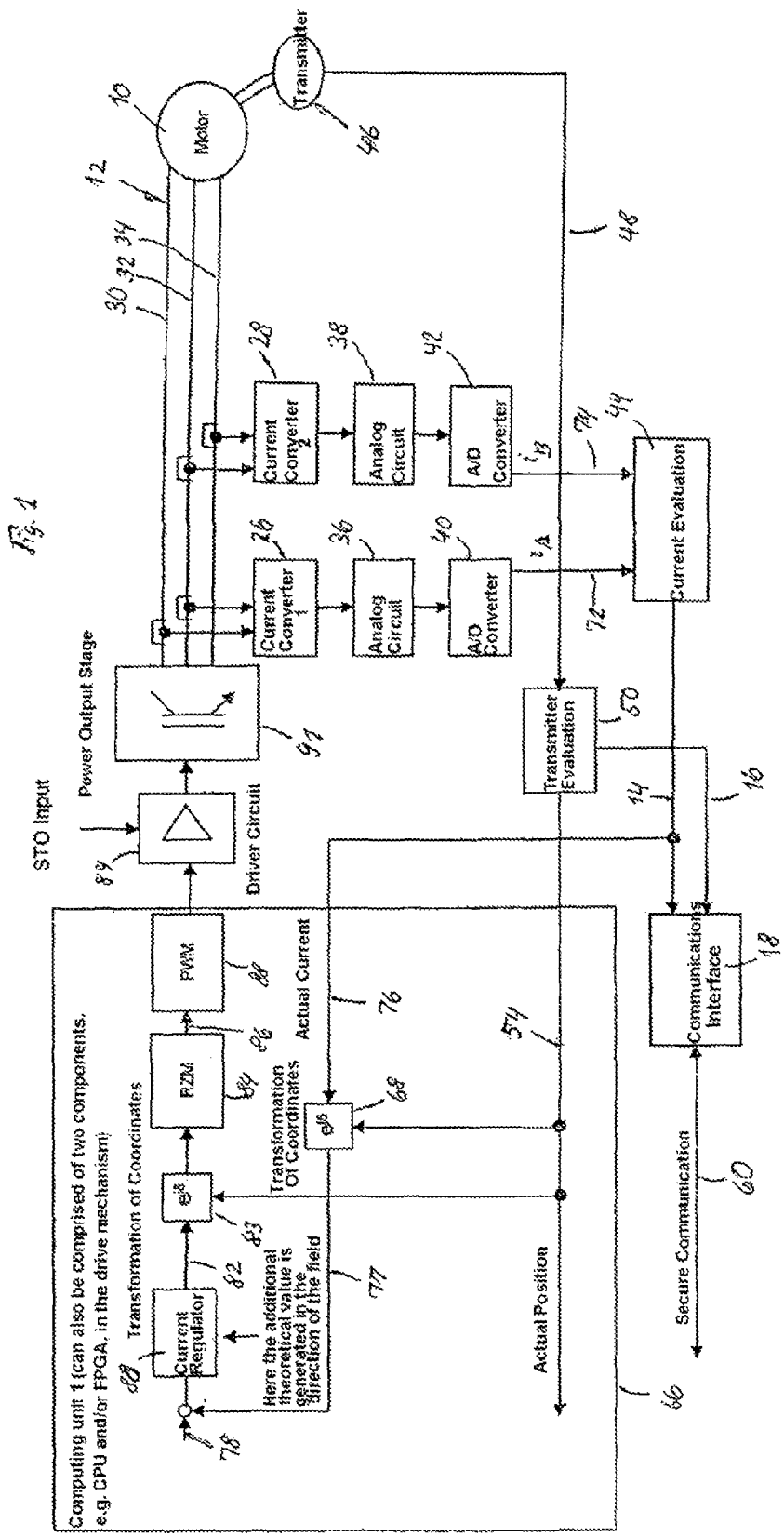
FIG. 1 a block diagram of the inventive arrangement.

FIG. 1 shows a block diagram of an arrangement for the improved measurement of the position of an electric machine 10 from the current 12 supplied to the motor; for a reliable operation, the measurement of the position of the drive mechanism is effected over two paths or channels 14, 16 that are independent of one another, and thereafter the two measured values (transmitter evaluation, current evaluation) are combined and checked with respect to a safe manner of operation, such as maintenance of a safe speed of the drive mechanism. If the channel 14 (current evaluation) is obtained by a computing device or computer, the channel 16 (transmitter evaluation) is obtained by means of a second computing device or computer, whereby the two computers operate independently of one another. The current value calculations are conveyed to one of the two independently operating computers, whereby this current value is derived from the current converters or shunts 1 and 2, blocks 26, 28, the current converters 1 and 2 each detecting two phases of the three phases 30, 32, 34 of the motor 10.

A respective analog circuit 36, 38 follows the current converters 1 and 2 respectively, and is in turn followed by an analog/digital converter 40, 42, which in turn conveys measured values 1A and 1B to a current value or amperage calculator 44; the current converter can involve various configurations, e.g. even a straightforward shunt resistor. The calculated current values are conveyed via line 14 to the communications interface in block 18, together with a transmitter signal, which is generated by a transmitter 46 operated by the motor 10 and conveyed via line 48 to a transmitter evaluation 50. An output signal of the transmitter evaluation 50 is conveyed via line 16 to the block 18. At the output of the communications interface or block 18 there are then signals available that are conveyed via a secured communication to an evaluation unit, where the two-channel position evaluation is designed to determine an error situation. In the event of an error, the power output stage 91 can be deactivated by means of the STO input of the driver circuit (see FIG. 1, block 89).

A further block 68, which on the one hand has the transmitter evaluation 50 (actual position) as an input, and from that calculates the actual current value in rotor coordinates, furthermore receives as an input signal 76 an output signal of the current value calculation 44 (actual current), whereby the output signals 72, 74 of the analog/digital converters 40, 42 are conveyed as inputs to the current value calculator 44.

The current value calculated in blocks 44 and 68 (transformation of coordinates) is conveyed via line 77 as an input quantity, together with a theoretical value 78 of a theoretical value transmitter, to the current regulator 80 as a differential; the current regulator is disposed in the circuit 66. The differential between the actual current value 76 and the adjustable theoretical current value 78 controls the current regulator 80. A control signal is obtained by the current regulator from the differential between the theoretical value and the actual value, and is introduced via the input 82, after transformation of coordinates in block 83, into a block 84 (RZM); from the block RZM, 84, which is part of the circuit 66, an output signal is conveyed via line 86 to the block 88 (PWM), which via a driver circuit 89, and a power output stage 91, controls the phase currents 30, 32, 34 for the motor 10.

The additional theoretical value is generated in the direction of the field of the motor in the current regulator 80. In this connection, this theoretical value is prescribed for the current regulator from the outside.

It is conceivable to have the various calculation stages be carried out by a single (central processing unit) CPU since this CPU can simultaneously process different programs. The computing unit 66 can also be comprised of two modules or components, e.g. CPU and FPGA, or only of a single FPGA.

The oscillogram in FIG. 2A shows the current in the stationary stator coordinate system, as it is delivered from the converters 40, 42. Here one can recognize that the current space vector fluctuates about zero, and thus it is not possible to make a reliable statement about in which direction the current vector lies.

Pursuant to FIG. 3A, the situation is better with the measurement being improved by a current that generates an additional field.

FIGS. 2A and 3A represent the unfiltered values, whereas FIGS. 2B and 3B result after filtration.

The arrangement illustrated in FIG. 1 enables a method for determining the position of an electric machine 10, here a motor having permanent magnetic generation of the magnetic field of the rotor (the magnetic field of a stator is produced by the circuit); with this arrangement, a position is determined from the supplied current 30, 32, 34. The arrangement is such that if individual components of the described circuit fail, it is nevertheless possible to operate reliably.

For this purpose, FIG. 1 shows three different complexes: first, the control loop or circuit, including the evaluation of the currents of the three phases 30, 32, 34 via two branches, each including current converter, analog circuit, analog/digital converter, whereby in this connection both channels convey signals 72, 74 to the current value calculator 44, the output of which is conveyed as a regulation quantity (actual value) 76, after transformation of coordinates in block 68, to the control circuit which includes the theoretical value 78, with the differential between theoretical value and actual value, the current regulator 80, and the following blocks 83, 84, 88, 89, 91, which produce the currents for the drive mechanism of the motor.

The second complex includes the transmitter 46, the transmitter evaluation 50, which enables the calculation of the speed and if the permissible speed is exceeded, stops e.g. the motor 10.

The specification incorporates by reference the disclosure of German 10 2008 031 201.0 filed Jul. 3, 2008 and International application PCT/EP2009/004845 filed Jul. 3, 2009.

The present invention is, of course, in no way restricted to the specific disclosure of the specification and drawings, but also encompasses any modifications within the scope of the appended claims.

The invention claimed is:

1. A method of determining the position of a drive mechanism of an electric machine from the current supplied to the machine, including the steps of:
effecting determination of the position of the electric machine over two paths or channels that are independent of one another to obtain two position values and thereafter combining the two position values and cross checking them with respect to a safe manner of operation or positioning of the drive mechanism, including the steps of: determining the position of the electric machine from two current channels by measuring a three-phase current of the electric machine to obtain measured values, IA, IB, converting the measured values to a current space vector, calculating the angle of the current space vector within one electrical revolution, and determining the position of the drive mechanism, wherein a current command, a field of which acts in the direction of a flux or field of the drive mechanism, is added within the electric machine.

2. A method according to claim 1, wherein said electric machine is a motor that includes a stator.

3. A method according to claim 2, wherein said drive mechanism is a rotor, and wherein said motor is a servomotor having permanent magnetic generation of the magnetic field of the rotor.

4. A method according to claim 3, wherein the angle of the current space vector serves for a determination of a position of the rotor.

5. A method according to claim 3, wherein the angle of the current space vector serves for a determination of a change in position over time, and hence of a speed of the rotor, or collectively of the position.

6. A method according to claim 3, wherein the field of the current command acts in the direction of the flux or field of the rotor, and is added within the stator.

7. An arrangement for an improved measurement of the position of a drive mechanism of an electric machine from the current supplied to the electric machine, wherein the measurement is effected over two paths or channels that are independent of one another to obtain two measured values, and wherein thereafter the two measured values are combined and are cross checked with respect to a safe manner of operation or positioning of the drive mechanism, comprising:
- a circuit configured for determination of the position of the drive mechanism in one of the channels;
- a sensor disposed in the circuit and configured to measure a three-phase current of the electric machine to obtain measured values;
- a converter following said sensor in the circuit and configured to convert the measured values of the three-phase current to a current space vector;
- a computing unit following said converter in the circuit and configured to calculate the angle of the current space vector within one electrical revolution and to determine the position of the drive mechanism; and
- a current regulator having an addition or summing unit configured to add, within the electric machine, a current command having a field that acts in the direction of a flux or field of the drive mechanism.

8. An arrangement according to claim 7, wherein the electric machine is a servomotor having a stator and having permanent magnetic generation of the magnetic field of the stator, and wherein the drive mechanism is a rotor.

9. An arrangement according to claim 8, wherein the angle of the current space vector serves for a determination of a position of the rotor in the servomotor.

10. An arrangement according to claim 8, wherein the angle of the current space vector serves for a determination of a change in position, and hence of a speed, of the rotor in the servomotor, or of a position of the rotor.

11. An arrangement according to claim 8, wherein said addition or summing unit is configured to be controlled such that the current command, the field of which acts in the direction of the rotor flux or rotor field, is added within the stator when the current that generates a torque is low in comparison to a rated current.

12. An arrangement according to claim 8, wherein the current command, the field of which acts in the direction of the rotor flux or rotor field, is added within the stator when a speed of the rotor is low in comparison to a rated speed.

13. An arrangement according to claim 8, wherein the current command, the field of which acts in the direction of the rotor flux or rotor field, is added within the stator when the current space vector moves about the value zero.

14. An arrangement according to claim 8, wherein the current command, the field of which acts in the direction of the rotor flux or rotor field, is added within the stator when due to regulation of the servo loops of the servomotor, the current space vector jumps back and forth.

* * * * *